US009858950B1

(12) United States Patent
Bueck et al.

(10) Patent No.: US 9,858,950 B1
(45) Date of Patent: Jan. 2, 2018

(54) DUAL-LAYER MAGNETIC RECORDING

(71) Applicant: International Business Machines Corporation, Armonk, NY (US)

(72) Inventors: Thomas Bueck, Mainz (DE); Michael Diederich, Mainz (DE); Thorsten Muehge, Budenheim (DE); Erik Rueger, Ockenheim (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/334,384

(22) Filed: Oct. 26, 2016

(51) Int. Cl.
G11B 5/02 (2006.01)
G11B 15/18 (2006.01)
G11B 5/09 (2006.01)
G11B 5/596 (2006.01)
G11B 5/00 (2006.01)

(52) U.S. Cl.
CPC ............. *G11B 5/09* (2013.01); *G11B 5/596* (2013.01); *G11B 2005/0021* (2013.01)

(58) Field of Classification Search
CPC ... G11B 33/1406; G11B 5/4866; G11B 5/653; G11B 5/68; G11B 5/725; G11B 5/8408; G11B 5/66; G11B 5/5521; G11B 5/654; G11B 5/667; G11B 2220/90; G11B 15/087; G11B 27/36; G11B 5/012; G11B 5/00; G11B 27/107
USPC ...... 360/59, 313, 328, 27, 72.1, 72.2, 73.12, 360/31, 39, 55; 369/13.13, 13, 32, 13.33
See application file for complete search history.

(56) References Cited

U.S. PATENT DOCUMENTS

| 7,876,530 | B2 | 1/2011 | Hinoue et al. |
| 8,120,875 | B2 | 2/2012 | Takagishi et al. |
| 8,345,518 | B2* | 1/2013 | Khizroev ............... G11B 5/64 360/59 |
| 8,455,119 | B1 | 6/2013 | Jiang et al. |

(Continued)

FOREIGN PATENT DOCUMENTS

JP 4746778 B2 8/2011

OTHER PUBLICATIONS

Varaprasad et al., "L1—Ordered FePt-Based Perpendicular Magnetic Recording Media for Heat-Assisted Magnetic Recording", IEEE Transactions on Magnetics, vol. 49, No. 2, Feb. 2013, © 2013 IEEE, 5 pages.

*Primary Examiner* — Nabil Hindi
(74) *Attorney, Agent, or Firm* — Gilbert Harmon, Jr.

(57) ABSTRACT

A method and apparatus for increasing storage capacity on magnetic media. A dual-layer magnetic recording apparatus receives, a write operation instruction, bit position and bit value where the bit position includes a media surface position and magnetic media layer identifier. The dual-layer magnetic recording apparatus accesses a dual-layer magnetic media where the dual-layer magnetic media includes a first magnetic media layer with a thermally controllable coercivity, a second magnetic media layer and a separation layer. The magnetic layer identifier is determined to associated with be the first magnetic media layer or the second magnetic media layer. When the magnetic layer identifier is the second magnetic media layer, the bit value is written based on magnetically charging the second magnetic media layer and when the magnetic layer identifier is the first magnetic media layer the bit value is written based on heating and magnetically charging the first magnetic media layer.

19 Claims, 3 Drawing Sheets

(56) References Cited

U.S. PATENT DOCUMENTS

| | | | |
|---|---|---|---|
| 2013/0004796 A1* | 1/2013 | Peng | G11B 5/73 428/827 |
| 2014/0133047 A1 | 5/2014 | Takahoshi et al. | |
| 2014/0247520 A1 | 9/2014 | Yang et al. | |

* cited by examiner

DUAL-LAYER MAGNETIC RECORDING

BACKGROUND OF THE INVENTION

The present invention relates generally to the field of magnetic data recordation of computer related media, and more particularly for increasing magnetic media storage capacity of magnetic media.

Magnetic media such as, but not limited to, hard disk drives can store binary information for use in computer processing and information retrieval. Binary/digital information can be stored as magnetic charges (e.g., logical bits) on a surface of the magnetic media. Increasing the quantity of stored bits on a magnetic media surface can be a key factor in maximizing data storage capabilities and minimizing the physical size of data storage equipment. A measure of the quantity of information bits that can be stored on a given surface area of computer storage medium (e.g., areal density/surface density) can be physically limited to the two dimensions of the surface of the media. While higher area storage density can be increased by orienting magnetic charge along the media surface (e.g., magnetic poles oriented in vertical/perpendicular arrangement versus horizontal/parallel arrangement) however the physical media surface area and charge retention capabilities of the media can limit areal density. Technologies such as Heat Assisted Magnetic Recording (HAMR) has been shown to improve bit density by affecting a recording media anisotropy through localized heat where areal density can approach 1 $TB/in^2$ however bit density is again limited by the available surface area of the magnetic media. As magnetic media storage demands for increased capacity and computing device decreased sizes, physical surface area constraints can be a limit toward achieving maximized areal density of magnetic media.

SUMMARY

As disclosed herein, a method for increasing storage capacity on magnetic media, the method comprising: receiving, by a dual-layer magnetic recording apparatus, a write operation instruction; receiving, by the dual-layer magnetic recording apparatus, a bit position and a bit value for the write operation instruction wherein the bit position comprises a magnetic media surface position and a magnetic media layer identifier; accessing, by the dual-layer magnetic recording apparatus, a dual-layer magnetic media wherein the dual-layer magnetic media comprises a first magnetic media layer with a thermally controllable coercivity, a second magnetic media layer and a separation layer; determining, by the dual-layer magnetic recording apparatus, if the magnetic media layer identifier is the first magnetic media layer or the second magnetic media layer; responsive to the magnetic media layer identifier is the second magnetic media layer, writing, by the dual-layer magnetic recording apparatus, the bit value based on magnetically charging the second magnetic media layer associated with the bit position and responsive to the magnetic media layer identifier is the first magnetic media layer, writing, by the dual-layer magnetic recording apparatus, the bit value based on heating the first magnetic media layer and magnetically charging the first magnetic media layer associated with the bit position. An apparatus and a computer system apparatus corresponding to the above method are also disclosed herein.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1A:
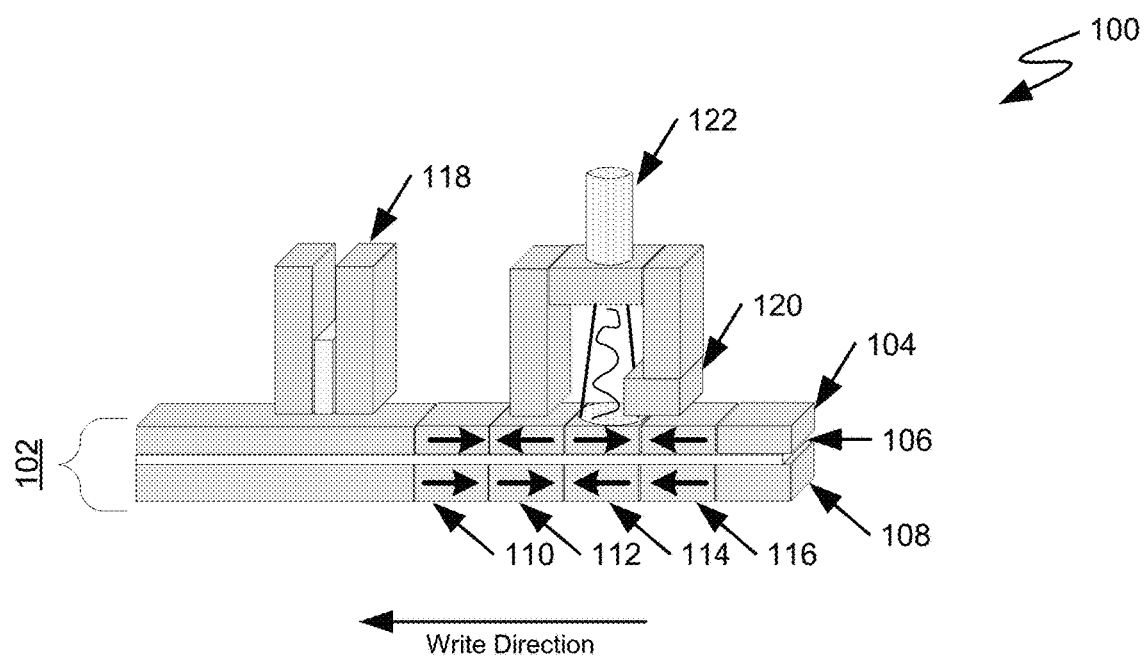
FIG. 1A illustrates an example dual layer magnetic recording apparatus, in accordance with an embodiment of the present invention.

Embodiments of the present invention provide an approach to writing information on a magnetic media having two layers. Dual-layer magnetic media can store four binary states (e.g., a logical true/false per layer) on a single surface position of magnetic media and thereby increases areal density of a comparable surface area of magnetic media. As understood by one skilled in the art, magnetic media can comprise magnetic charges representing logical bits (e.g., binary one (1) or zero (0)). The magnetic charges stored on magnetic media can be identified as logical one or zero based on the direction/orientation of the north and south facing poles and magnetic charge orientation can be in arrangements such as, but not limited to, horizontal/parallel and vertical/perpendicular to the media surface. Different magnetic bit orientations (e.g., parallel, perpendicular) can offer technical benefits related toward areal density and it should be noted that embodiments of the present invention can be suitable with a combination of magnetic orientations among the layers of dual layer media. Dual layer magnetic media can be described as comprising of two magnetic media layers where a first magnetic media layer data can be written using technology known by one skilled in the art as heat assisted magnetic recording (HAMR) and a second magnetic media layer can be written using technology known by one skilled in the art as conventional magnetic recording. The two magnetic media layers can be separated by a layer of material to act as a magnetic boundary layer between the first magnetic media layer without affecting magnetic conduction of the second magnetic media layer toward a read/write apparatus. As embodiments of the present invention can write a first magnetic media layer using heat assistance and a second magnetic media layer without heat assistance, storage capacity can be doubled for a single media surface position. For example, a magnetic media bit position/location can store four binary states (e.g., 0/1 on first layer and 0/1 on second layer) on a single side of magnetic media to double magnetic media areal density.

Embodiments of the present invention will now be described in detail with reference to the figures. It should be noted that references in the specification to "an exemplary embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure or characteristic is described in connection with an embodiment, it is submitted that it is within the knowledge of one skilled in the art to affect such feature, structure or characteristic in connection with other embodiments whether or not explicitly described. The figures are not necessarily to scale, elements and features can have different dimensions from those depicted in the figures. Therefore, specific structural and functional details disclosed herein are not to be interpreted as limiting, but merely as a representative basis for teaching one skilled in the art to variously employ the present invention.

FIG. 1A illustrates an example dual-layer magnetic recording apparatus 100, in accordance with an embodiment of the present invention. It should be appreciated that FIG. 1A provides only an illustration of one implementation and does not imply any limitations with regard to the environments in which different embodiments may be implemented and many modifications to the depicted environment may be made. In the depicted embodiment, dual-layer magnetic recording apparatus 100 can be incorporated in devices such as, but not limited to, a hard disk drive, not depicted, which can comprise moveable mounting arm(s) for positioning read/write heads, rotating magnetic media disk(s) and a controller for operating the apparatus during read/write operations. As depicted, dual-layer magnetic recording apparatus 100 comprises, items RECORDING MEDIA 102, READ ELEMENT 118 and WRITE ELEMENT 120.

Item RECORDING MEDIA 102 illustrates a composite assembly of dual-layer magnetic media and the depicted cross-section of item RECORDING MEDIA 102 comprises, items MAGNETIC LAYER_1 104, SEPARATION LAYER 106 and MAGNETIC LAYER_2 108. Item MAGNETIC LAYER_1 104 illustrates a HAMR capable magnetic media layer. For example, item MAGNETIC LAYER_1 104 material properties can exhibit heat controlled anisotropic properties that lower/increase material coercivity as heat is applied/removed. Coercivity can be defined as the ability of a material to withstand an external electric/electro-magnetic field without becoming depolarized and/or the point where a material's magnetic charge can be altered/set. It should be noted that materials used and respective coercivity ranges available using HAMR technology should be known by one skilled in the art. It should be further noted, item RECORDING MEDIA 102 can further comprise protective interposition layers and/or supporting substrate(s), not depicted.

Item SEPARATION LAYER 106 illustrates a separation layer between items MAGNETIC LAYER_1 104 and MAGNETIC LAYER_2 108. Item SEPARATION LAYER 106 can magnetically separate item MAGNETIC LAYER_1 104 and item MAGNETIC LAYER_2 108 while item SEPARATION LAYER 106 exhibits magnetic permeability (e.g., having non-ferromagnetic and/or non-paramagnetic properties). Further, item SEPARATION LAYER 106 should be as sufficiently thin to minimize dampening of item MAGNETIC LAYER_2 108 magnetic charge when accessed in combination with item MAGNETIC LAYER_1 104. For example, item SEPARATION LAYER 106 can comprise materials such as, but not limited to, Aluminum Oxide (e.g., $Al_2O_3$). Item MAGNETIC LAYER_2 108 illustrates magnetic media layer which is not heat activated and item MAGNETIC LAYER_2 108 exhibits a coercivity strength greater than item MAGNETIC LAYER_1 104 coercivity when heated and a coercivity strength less than item MAGNETIC LAYER_1 104 coercivity when not heated.

Item RECORDING MEDIA 102 further illustrates items STATE_1 110, STATE_2 112, STATE_3 114 and STATE_4 116 as possible bit arrangements stored on item RECORDING MEDIA 102. Items STATE_1 110 and STATE_4 116 illustrates bit storage area where dual-layer magnetic recording media comprise a same logical bit (e.g., 00, 11). Items STATE_2 112 and STATE_3 114 illustrates bit storage area where dual-layer magnetic recording media comprises opposite logical bits (e.g., 01, 10).

Item READ ELEMENT 118 illustrates dual-layer magnetic media read element (e.g., adjacent to item MAGNETIC LAYER_1 104) that can detect magnetic strength and magnetic polarity for a magnetic media surface bit position which can be used to determine four states of logical bits (e.g., detect 00, 01, 10 or 11). For example, item READ ELEMENT 118 can comprise a Giant Magneto-Resistive (GMR) read element. It should be noted that the dual-layer magnetic media layers form a pan-magnetic moment which can be measured by generating a total magnetic field using item READ ELEMENT 118. In other words, bits from both item MAGNETIC LAYER_1 104 and item MAGNETIC LAYER_2 108 can be read from a single bit position by item READ ELEMENT 118 simultaneously. It should be noted that in some embodiments item READ ELEMENT 118 can be attached toward a moveable mounting arm(s).

Item WRITE ELEMENT 120 illustrates a dual-layer magnetic media write element (e.g., adjacent to item MAGNETIC LAYER_1 104) capable of combined HAMR and conventional magnetic recording. Item WRITE ELEMENT 120 can be an electro-magnetic apparatus that can apply a range of magnetic charges toward item MAGNETIC LAYER_1 104 and item MAGNETIC LAYER_2 108 based on respective coercivity properties of item MAGNETIC LAYER_1 104, when heated, and item MAGNETIC LAYER_2 108. Item LASER 122 illustrates a Light Amplification by Stimulated Emission Radiation (laser) heating component used in conjunction with HAMR based magnetic recording when storing data (e.g., setting magnetic charges) toward item MAGNETIC LAYER_1 104 and item LASER 122 is deactivated when storing data toward item MAGNETIC LAYER_2 108. It should be noted that item WRITE ELEMENT 120 can operate at different magnetic strengths based on coercivity strength of item MAGNETIC LAYER_1 104 and item MAGNETIC LAYER_2 108 respectively. For example, item WRITE ELEMENT 120 can apply a lower magnetic charge strength during an item MAGNETIC LAYER_1 104 write operation (e.g., corresponding the coercivity of a heated item MAGNETIC LAYER_1 104) as compared to a higher applied magnetic charge strength of item WRITE ELEMENT 120 toward item MAGNETIC LAYER_2 108 (e.g., corresponding the coercivity of item MAGNETIC LAYER_2 108). It should be noted that the applied magnetic charge strength of item WRITE ELEMENT 120 toward item MAGNETIC LAYER_2 108 should not exceed the corresponding coercivity of an unheated item MAGNETIC LAYER_1 104 when writing toward item MAGNETIC LAYER_2 108. It should be further noted that in some embodiments, item WRITE ELEMENT 120 can be attached toward a moveable mounting arm(s). Still further in some embodiments, item WRITE ELEMENT 120 can integrate item READ ELEMENT 118 into a single apparatus element.

Figure 1B:
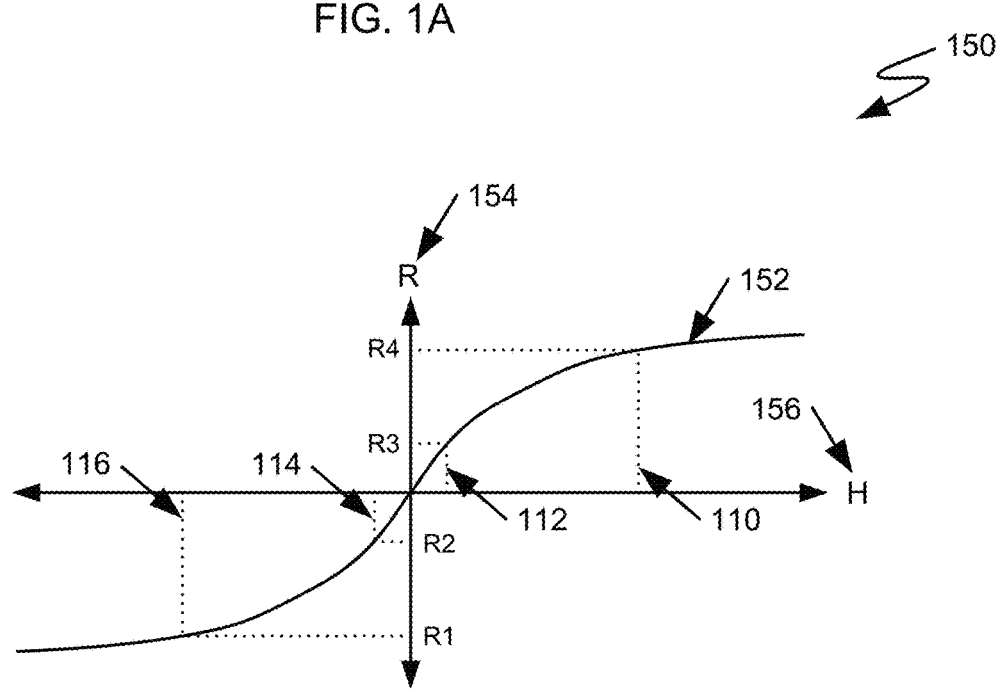
FIG. 1B illustrates an example read sensor transfer curve of dual layer magnetic recording apparatus, in accordance with an embodiment of the present invention.

FIG. 1B illustrates an example read sensor transfer curve of dual layer magnetic recording apparatus, in accordance with an embodiment of the present invention. Read sensor transfer curve 150, comprises items TRANSFER RESPONSE 152, RESISTIVITY 154 and MAGNETIC STRENGTH 156.

Item TRANSFER RESPONSE 152 illustrates an electric response curve (e.g., resistivity versus magnetic field) of item RECORDING MEDIA 102 and item RESISTIVITY 154 illustrates sensor resistivity where four states ('R1', 'R2', 'R3' and 'R4') can correspond to different magnetic states of dual-layer magnetic media that can be distinguished by item READ ELEMENT 118. Resistivity changes of item READ ELEMENT 118 are used to distinguish the different magnetic states of the dual layer media.

Traversing item TRANSFER RESPONSE 152 from left to right, item STATE_1 110 can represent logical zeroes for both magnetic layers (e.g., item MAGNETIC LAYER_1 104 and item MAGNETIC LAYER_2 108) assuming that combined south facing magnetic charges represent item RESISTIVITY 154 value 'R1'. Item STATE_3 114 and item STATE_2 112 can represent combined item RESISTIVITY 154 values 'R2' and 'R3' respectively and have opposing magnetic charge polarities. In this case, item RESISTIVITY 154 values 'R2' and 'R3' are lower magnetic magnitude as north/south polarities of respective item MAGNETIC LAYER_1 104 and item MAGNETIC LAYER_2 108 are magnetic polarity opposed, reducing cumulative magnetic strength, as compared to item MAGNETIC LAYER_1 104 and item MAGNETIC LAYER_2 108 which have common magnetic polarities. It should be noted that the magnitude of magnetic charge of item MAGNETIC LAYER_1 104 and item MAGNETIC LAYER_2 108 can differ so that zero, one (0,1) and one, zero (1,0) logical states result in a dominant composite charge being south or north facing. For example, a magnetic strength of a bit for item MAGNETIC LAYER_2 108 can be greater than the corresponding magnetic strength of a but in a bit position of item MAGNETIC LAYER_1 104 to cause the north/south dominance by item MAGNETIC LAYER_2 108. The magnetism strength range and polarity dominance between item RESISTIVITY 154 values 'R2' and 'R3' can enable a distinction between bit value combinations of '0,1' versus '1,0' logical states.

Item STATE_4 116 can represent logical ones for both magnetic layers (e.g., item MAGNETIC LAYER_1 104 and item MAGNETIC LAYER_2 108) assuming combined north facing magnetic charges represent item RESISTIVITY 154 value 'R4'.

Figure 2A:
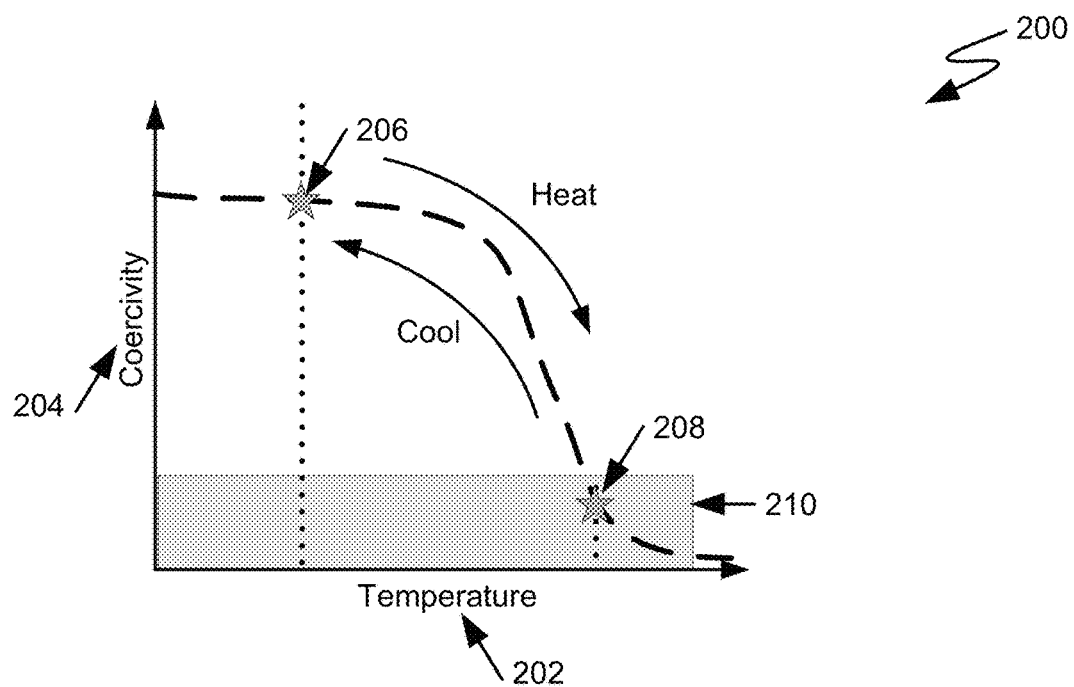
FIG. 2A illustrates a heat affected coercivity graph, in accordance with an embodiment of the present invention.

FIG. 2A illustrates a heat affected coercivity graph, in accordance with an embodiment of the present invention and heat affected coercivity 200 comprises items TEMPERATURE 202, COERCIVITY 204, STORED BIT 206, WRITE BIT 208 and WRITE HEAD FIELD 210.

Item TEMPERATURE 202 illustrates media temperature level (e.g., item MAGNETIC LAYER_1 104) where item COERCIVITY 204 illustrates coercivity strength. As a HAMR capable magnetic media is in a 'cooled' state, item STORED BIT 206 illustrates media coercivity strength where a magnetic bit state can be stored that can be unaffected when a bit is written toward item MAGNETIC LAYER_2 108. Item WRITE BIT 208 illustrates media coercivity strength where a magnetic bit state can be stored when the magnetic media is in a 'heated' condition. When item MAGNETIC LAYER_1 104 is in a heated condition, item WRITE HEAD FIELD 210 illustrates a coercivity strength range where item WRITE ELEMENT 120 can write a bit toward item MAGNETIC LAYER_1 104. It should be noted that, item WRITE BIT 208 coercivity strength can be less than item MAGNETIC LAYER_2 108 coercivity strength so that a magnetic bit can be stored toward item MAGNETIC LAYER_1 104 without affecting item MAGNETIC LAYER_2 108.

Figure 2B:
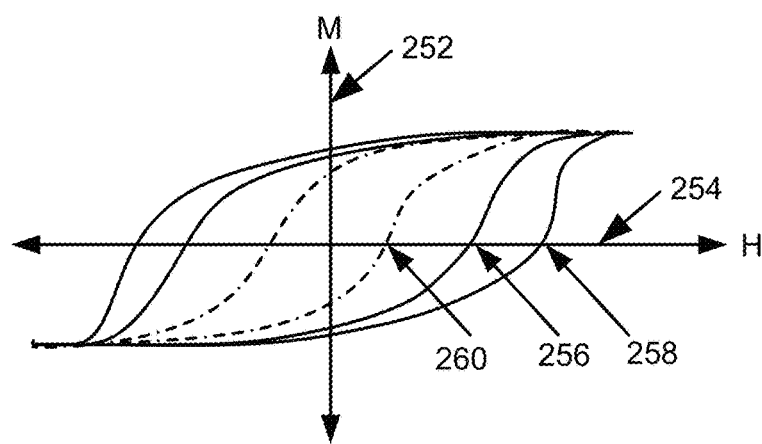
FIG. 2B illustrates magnetic coercivity of ferromagnetic materials of dual layer media, in accordance with an embodiment of the present invention.

FIG. 2B illustrates magnetic coercivity of ferromagnetic materials of dual layer media, in accordance with an embodiment of the present invention. Dual layer media hysteresis loops 250 comprises items MAGNETIZATION 252, FIELD STRENGTH 254, HYSTERESIS LOOP_1 256, HYSTERESIS LOOP_2 258 and HYSTERESIS LOOP_3 260. With increasing temperature, the coercivity of item MAGNETIC LAYER_1 104 decreases and the reduced coercivity of item MAGNETIC LAYER_1 104 enables the ability to set an item MAGNETIC LAYER_1 104 magnetic bit without affecting item MAGNETIC LAYER_2 108 magnetic bit. In FIG. 2B, hysteresis loops are plotted where item MAGNETIZATION 252 illustrates magnetic strength and item FIELD STRENGTH 254 illustrates magnetizing field strength. Coercivity of each hysteresis loop is indicated as item FIELD STRENGTH 254 is crossed. It should be noted that hysteresis can be defined as a change in magnetic field of a body in response to an external magnetic/electromagnetic influence.

Item HYSTERESIS LOOP_1 256 illustrates item MAGNETIC LAYER_2 108 hysteresis loop coercivity where magnetic storage responds to conventional methods (e.g., no heat applied). Item HYSTERESIS LOOP_2 258 illustrates item MAGNETIC LAYER_1 104 hysteresis loop coercivity in a cooled/non-heated state. The exhibited higher coercivity as compared to item HYSTERESIS LOOP_1 256 provides the ability to write toward item MAGNETIC LAYER_2 108 without affecting data stored on item MAGNETIC LAYER_1 104 for a given bit position. Conversely, item HYSTERESIS LOOP_3 260 (e.g., dot-dash line) illustrates item MAGNETIC LAYER_1 104 hysteresis loop coercivity with heat applied. The exhibited lower coercivity as compared to item HYSTERESIS LOOP_1 256 provides the ability to write toward item MAGNETIC LAYER_1 104 without affecting data stored on item MAGNETIC LAYER_2 108 for a given bit position.

Figure 3:
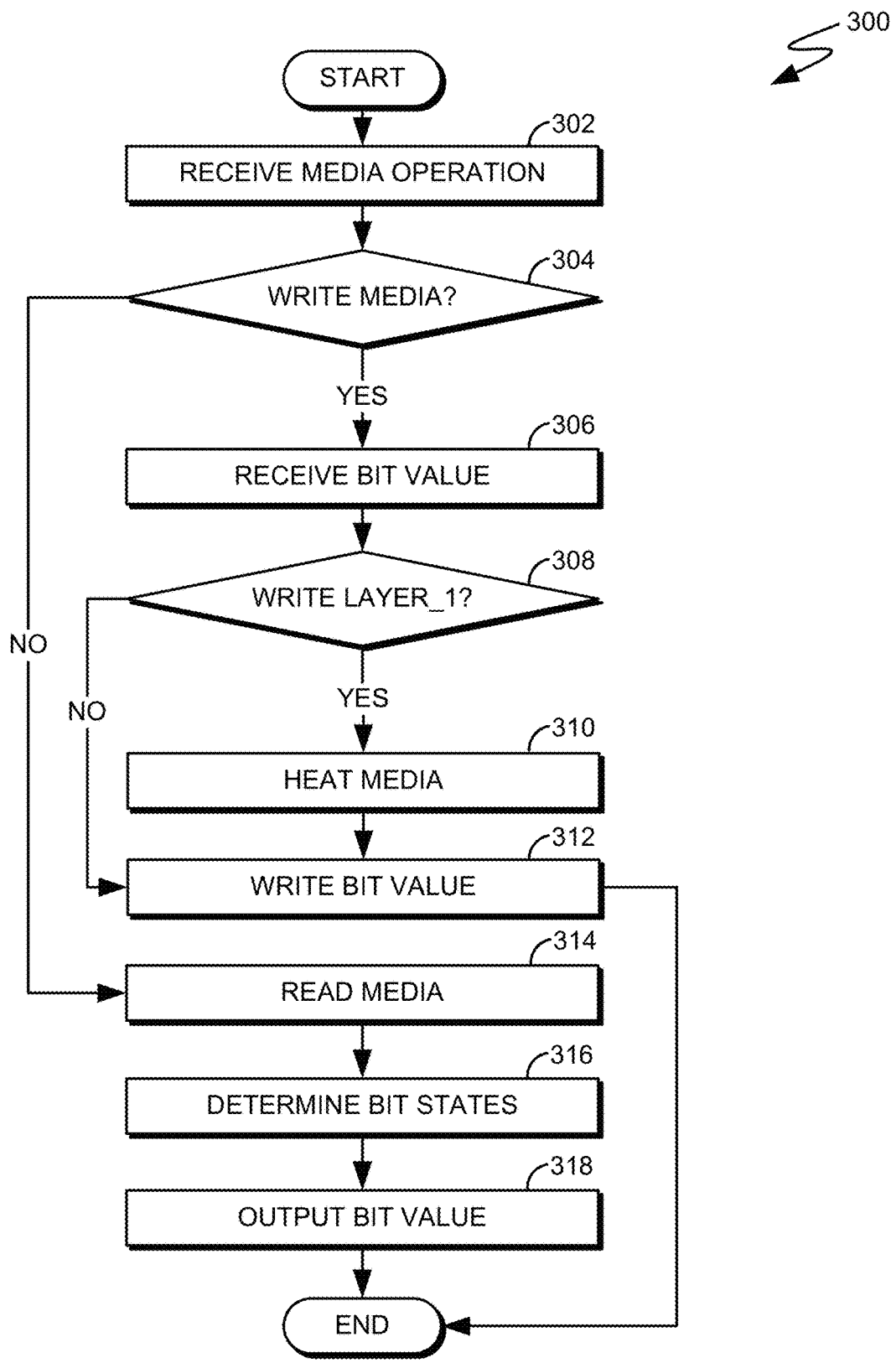
FIG. 3 illustrates a flowchart of dual-layer magnetic recording operation, in accordance with an embodiment of the present invention.

FIG. 3 illustrates a flowchart of dual-layer magnetic recording operation, in accordance with an embodiment of the present invention. Dual-layer magnetic recording 300, comprises operations RECEIVE MEDIA OPERATION 302, WRITE MEDIA 304, RECEIVE BIT VALUE 306, WRITE LAYER_1 308, HEAT MEDIA 310, WRITE BIT VALUE 312, READ MEDIA 314, DETERMINE BIT STATES 316 and OUTPUT BIT VALUE 318. It should be noted that aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

Operation RECEIVE MEDIA OPERATION 302, can receive a write operation instruction or a read operation instruction and a bit position for a data bit to be accessed on dual-layer magnetic media. It should be noted that the bit position comprises a magnetic media surface position/location and a magnetic layer identifier (e.g., item MAGNETIC LAYER_1 104 or item MAGNETIC LAYER_2 108). Operation RECEIVE MEDIA OPERATION 302 can also determine that the magnetic layer identifier identifies a first magnetic media layer or a second magnetic media layer of the dual-layer magnetic media. When operation RECEIVE MEDIA OPERATION 302 completes, processing proceeds toward operation WRITE MEDIA 304.

Operation WRITE MEDIA 304, can determine if a write operation instruction was received. If a write operation instruction was received (e.g., YES) then processing can proceed toward operation RECEIVE BIT VALUE 306, otherwise processing can proceed toward operation READ MEDIA 314.

Operation RECEIVE BIT VALUE 306, can receive a bit value to be written (e.g., 0 or 1) and execution proceeds toward operation WRITE LAYER_1 308. Operation WRITE LAYER_1 308, can determine if the magnetic layer identifier is the first magnetic media layer (e.g., item MAGNETIC LAYER_1 104) or the second magnetic media layer (e.g., item MAGNETIC LAYER_2 108). If the magnetic layer identifier is the first magnetic media layer (e.g., 'YES') then execution proceeds toward operation HEAT MEDIA 310, otherwise, processing proceeds toward operation WRITE BIT VALUE 312.

Operation HEAT MEDIA 310, can access the first magnetic media layer of a dual-layer magnetic media and heat (e.g., via item LASER 122) the first magnetic media layer to lower item MAGNETIC LAYER_1 104 coercivity below the coercivity of item MAGNETIC LAYER_2 108. When operation HEAT MEDIA 310 completes, processing proceeds toward operation WRITE BIT VALUE 312.

Operation WRITE BIT VALUE 312, can magnetically charge the dual-layer magnetic media to store a bit value based on the received bit position. Item MAGNETIC LAYER_2 108 can be written with the bit value using dual-layer magnetic media writing element (e.g., item WRITE ELEMENT 120) at an electro-magnetic charge that overcomes the coercivity strength of item MAGNETIC LAYER_2 108 whereas item WRITE ELEMENT 120 can write toward item MAGNETIC LAYER_1 104 with sufficient electro-magnetic charge corresponding a coercivity strength item MAGNETIC LAYER_1 104 that is thermally lowered by operation HEAT MEDIA 310 and with a coercivity below item MAGNETIC LAYER_2 108 coercivity strength. When operation WRITE BIT VALUE 312 is complete, execution ends.

Operation READ MEDIA 314, can receive the bit position for a read operation instruction and access a first magnetic media layer (e.g., item MAGNETIC LAYER_1 104) or first magnetic media layer (e.g., item MAGNETIC LAYER_2 108) of dual-layer magnetic media based on the bit position. The bit position is located and four-state magnetic data is received from the dual-layer magnetic media via a dual-layer magnetic media read element (e.g., item READ ELEMENT 118). When operation READ MEDIA 314 completes, processing proceeds toward operation DETERMINE BIT STATES 316.

Operation DETERMINE BIT STATES 316, can determine a bit value based on the four-state magnetic data received from operation READ MEDIA 314 and an associated magnetic layer identifier. For example, a four-state magnetic data can be a state value of zero, one (0,1) (e.g., item STATE_2 112) and based on a magnetic layer identifier of one (1) (e.g., item MAGNETIC LAYER_1 104) then a bit value can be determined to be a zero (0). When operation DETERMINE BIT STATES 316 completes, processing proceeds toward operation OUTPUT BIT VALUE 318.

Operation OUTPUT BIT VALUE 318, can output the bit value based on the magnetic layer identifier layer and the bit position. When operation OUTPUT BIT VALUE 318 completes, processing ends The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The term "present invention" should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

The term "and/or" should be understood as inclusive or; for example, A, B "and/or" C means that at least one of A, B or C is true and applicable. Further, "at least one of A, B, or C" should be interpreted to mean only A, only B, only C, or any combination of A, B, and C.

What is claimed is:

1. A method for increasing storage capacity on magnetic media, the method comprising:

receiving, by a dual-layer magnetic recording apparatus, a write operation instruction;

receiving, by the dual-layer magnetic recording apparatus, a bit position and a bit value for the write operation instruction wherein the bit position comprises a magnetic media surface position and a magnetic media layer identifier;

accessing, by the dual-layer magnetic recording apparatus, a dual-layer magnetic media wherein the dual-layer magnetic media comprises a first magnetic media layer with a thermally controllable coercivity, a second magnetic media layer and a separation layer;

determining, by the dual-layer magnetic recording apparatus, if the magnetic media layer identifier is the first magnetic media layer or the second magnetic media layer;

responsive to the magnetic media layer identifier is the second magnetic media layer, writing, by the dual-layer magnetic recording apparatus, the bit value based on magnetically charging the second magnetic media layer associated with the bit position; and responsive to the magnetic media layer identifier is the first magnetic media layer, writing, by the dual-layer magnetic recording apparatus, the bit value based on heating the first magnetic media layer and magnetically charging the first magnetic media layer associated with the bit position.

2. The method of claim 1, further comprising:

receiving, by the dual-layer magnetic recording apparatus, a read operation instruction;

receiving, by the dual-layer magnetic recording apparatus, a bit position for the read operation instruction;

receiving, by the dual-layer magnetic recording apparatus, four-state magnetic data from the dual-layer magnetic media by a dual-layer magnetic media read element based on the bit position;

determining, by the dual-layer magnetic recording apparatus, the bit value based on the four-state magnetic data and the magnetic media layer identifier; and outputting, by the dual-layer magnetic recording apparatus, the bit value.

3. The method of claim 1, wherein the second magnetic media layer has a coercivity in a range between the coercivity of the first magnetic media layer in heated and cooled states.

4. The method of claim 1, wherein the dual-layer magnetic media write element comprises a heat assisted magnetic recording laser and a magnetic media write element.

5. The method of claim 2, wherein the four-state magnetic data is based on four-states of magnetic magnitude.

6. The method of claim 1, wherein heating the first magnetic media layer writing is based on the dual-layer magnetic media write element heating the bit position of the first magnetic media layer to lower the first magnetic media layer coercivity to a value less than the second magnetic media layer coercivity.

7. The method of claim 1, wherein the separation layer comprises magnetically permeable properties.

8. An apparatus for dual-layer magnetic media access, the apparatus comprising:
- a rotating dual-layer magnetic media comprising a first magnetic media layer with a thermally controllable coercivity, a second magnetic media layer and a separation layer disposed between the first magnetic media layer and the second magnetic media layer;
- a controllable moveable mounting arm adjacent to the first magnetic media layer;
- a magnetic media write head attached to the mounting arm;
- a heat assisted magnetic recording laser attached to the magnetic media write head;
- a dual-layer magnetic media read head attached to the mounting arm wherein the dual-layer magnetic media read head detects combined magnetic magnitude of the first magnetic media layer and the second magnetic media layer; and
- a controller for positioning the mounting arm for reading or writing, setting a magnetic charge and activating the heat assisted magnetic recording laser for writing to the first magnetic media layer.

9. The apparatus of claim 8, wherein the second magnetic media layer has a coercivity in a range between the coercivity of the first magnetic media layer in heated and cooled states.

10. The apparatus of claim 8, wherein the heat assisted magnetic recording laser is activated for the first magnetic media layer to lower the first magnetic media layer coercivity below the coercivity of the second magnetic media layer for setting the magnetic charge.

11. The apparatus of claim 8, wherein the magnetic media write head operates a first magnetic charge of the first magnetic media layer based on a heated coercivity of the first magnetic media layer.

12. The apparatus of claim 8, wherein the magnetic media write head operates a second magnetic charge of the second magnetic media layer based on the coercivity of the second magnetic media layer.

13. The apparatus of claim 8, wherein the separation layer comprises magnetically permeable properties.

14. A computer system for dual-layer magnetic media access, the computer system comprising:
- one or more processors;
- computer memory;
- one or more non-transitory computer readable storage media comprising:
  - a rotating dual-layer magnetic media comprising a first magnetic media layer with a thermally controllable coercivity, a second magnetic media layer and a separation layer disposed between the first magnetic media layer and the second magnetic media layer;
  - a controllable moveable mounting arm adjacent to the first magnetic media layer;
  - a magnetic media write head attached to the mounting arm;
  - a heat assisted magnetic recording laser attached to the magnetic media write head;
  - a magnetic media read head attached to the mounting arm;
  - a controller for positioning the mounting arm for reading or writing, setting a magnetic charge and activating the heat assisted magnetic recording laser for writing to the first magnetic media layer;
- program instructions stored on the one or more computer non-transitory readable storage media for execution by at least one of the one or more processors, the program instructions comprising:
  - receiving, by a dual-layer magnetic recording apparatus, a write operation instruction;
  - receiving, by the dual-layer magnetic recording apparatus, a bit position and a bit value for the write operation instruction wherein the bit position comprises a magnetic media surface position and a magnetic media layer identifier;
  - accessing, by the dual-layer magnetic recording apparatus, a dual-layer magnetic media wherein the dual-layer magnetic media comprises a first magnetic media layer with a thermally controllable coercivity, a second magnetic media layer and a separation layer;
  - determining, by the dual-layer magnetic recording apparatus, if the magnetic media layer identifier is the first magnetic media layer or the second magnetic media layer;
  - responsive to the magnetic media layer identifier is the second magnetic media layer, writing, by the dual-layer magnetic recording apparatus, the bit value based on magnetically charging the second magnetic media layer associated with the bit position; and
  - responsive to the magnetic media layer identifier is the first magnetic media layer, writing, by the dual-layer magnetic recording apparatus, the bit value based on heating the first magnetic media layer and magnetically charging the first magnetic media layer associated with the bit position.

15. The computer system of claim 14, further comprising:
receiving, by the dual-layer magnetic recording apparatus, a read operation instruction;
receiving, by the dual-layer magnetic recording apparatus, a bit position for the read operation instruction;
receiving, by the dual-layer magnetic recording apparatus, four-state magnetic data from the dual-layer magnetic media by a dual-layer magnetic media read element based on the bit position;
determining, by the dual-layer magnetic recording apparatus, the bit value based on the four-state magnetic data and the magnetic media layer identifier; and
outputting, by the dual-layer magnetic recording apparatus, the bit value.

16. The computer system of claim 14, wherein the second magnetic media layer has a coercivity in a range between the coercivity of the first magnetic media layer in heated and cooled states.

17. The computer system of claim 14, wherein the heat assisted magnetic recording laser is activated for the first magnetic media layer to lower the first magnetic media layer coercivity below the coercivity of the second magnetic media layer for setting the magnetic charge.

18. The computer system of claim 14, wherein the magnetic media write head operates a first magnetic charge of the first magnetic media layer based on a heated coercivity of the first magnetic media layer and the magnetic media write head operates a second magnetic charge of the second magnetic media layer based on the coercivity of the second magnetic media layer.

19. The computer system of claim 14, wherein the dual-layer magnetic media read element detects combined magnetic magnitude of the first magnetic media layer and the second magnetic media layer.

* * * * *